(12) United States Patent
Nehring et al.

(10) Patent No.: US 6,841,105 B2
(45) Date of Patent: Jan. 11, 2005

(54) PROCESS FOR MANUFACTURING THERMOFORMED ARTICLE HAVING TEXTURED OR GRAINED SURFACE

(75) Inventors: Gary J. Nehring, Linden, MI (US); John C. Montagna, Metamora, MI (US)

(73) Assignee: Durakon Industries, Inc., Lapeer, MI (US)

( * ) Notice: Subject to any disclaimer, the term of this patent is extended or adjusted under 35 U.S.C. 154(b) by 310 days.

(21) Appl. No.: 10/135,602

(22) Filed: Apr. 30, 2002

(65) Prior Publication Data

US 2003/0203160 A1 Oct. 30, 2003

(51) Int. Cl.[7] .................... B29C 44/12; B29C 51/12; B29C 59/02
(52) U.S. Cl. .................. 264/46.8; 264/151; 264/210.2; 264/263; 264/266; 264/284; 264/293; 264/510; 264/544; 264/545
(58) Field of Search ................ 264/46.8, 151, 264/210.2, 263, 266, 284, 293, 510, 544, 545

(56) References Cited

U.S. PATENT DOCUMENTS

| | | |
|---|---|---|
| 4,341,412 A | 7/1982 | Wayne |
| 4,676,938 A | 6/1987 | Karklin et al. |
| 4,693,507 A | 9/1987 | Dresen et al. |
| 4,769,106 A | 9/1988 | Busching |
| 5,167,969 A | 12/1992 | DeMaio, Jr. et al. |
| 5,492,663 A * | 2/1996 | Greenwald et al. ......... 264/154 |
| 5,648,031 A | 7/1997 | Sturtevant et al. |
| 5,658,523 A | 8/1997 | Shuert |
| 6,200,122 B1 | 3/2001 | Chun et al. |
| 6,231,938 B1 * | 5/2001 | Gockel et al. ............. 428/35.7 |
| 6,294,114 B1 | 9/2001 | Muirhead |

* cited by examiner

Primary Examiner—Leo B. Tentoni
(74) Attorney, Agent, or Firm—Akin Gump Strauss Hauer & Feld, LLP

(57) ABSTRACT

A method of forming thermoplastic panels is disclosed which includes the steps of forming the thermoplastic panels by extrusion or a similar process and simultaneously or subsequently texturing or graining at least one face thereof, and utilizing such pre-textured or pre-grained panels to form a finished panel or article by disposing such panel in a thermoforming mold having at least one grained or textured mold surface against which the pre-textured or pre-grained surface of the panel is disposed and thermoforming such panel. The process provides a textured or grained surface having greatly improved uniformity and enhanced appearance.

19 Claims, 6 Drawing Sheets

PROCESS FOR MANUFACTURING THERMOFORMED ARTICLE HAVING TEXTURED OR GRAINED SURFACE

BACKGROUND OF THE INVENTION

The invention relates generally to a method of thermoforming an article from thermoplastic panels having textured or grained surfaces and more specifically to a method of thermoforming an article in a mold having textured or grained surfaces from thermoplastic panels having textured or grained surfaces which provides improved surface appearance.

The suitability of relatively large thermoplastic panels for use in various vehicular and automotive products is a direct result of both the ruggedness and stability of the material from which the panel is formed and the final characteristics of the product which include both structural and aesthetic considerations. Stated somewhat differently, the utilization of thermoplastic panels in vehicular and automotive applications has increased as the stability, strength and appearance of such products has increased.

Frequently such products are utilized as covers for hatches, storage containers and pickup truck beds. As such, a thermoformed product must typically span a relatively large region and must therefore be strong and relatively immune to creep or dimensional instabilities resulting from temperature swings or short or long term loads impressed thereupon. If, as is often the case, such thermoplastic products are utilized as hatches or covers on a vehicle where they are readily visible, their appearance is critical both from a large dimension standpoint, i.e., warps and ripples, and a small dimension standpoint, i.e., surface uniformity, whether the surface is smooth or contains grain or texture.

For product surfaces requiring texture or grain, a typical prior art manufacturing process begins with a smooth thermoplastic panel which is placed into a mold wherein one or both mold surfaces are textured or grained. The mold is closed and vacuum and/or pressure are applied to appropriate faces of the thermoplastic sheet to drive it into conformance with the mold and simultaneously grain or texture the surface in contact with the textured or grained mold surface.

An aesthetic problem has been detected with regard to such processes wherein the grained or textured surface appears to have a ring or halo-like imperfection or variation of the texturing or graining which is typically centered about the center of the panel. The visible halo is the result of changes in reflectivity of the textured or grained surface. While the mechanism of formation of the halo is not fully understood, it is believed to result from non-uniform stretching of the thermoplastic panel along radial paths extending from the center of the panel to the edges. That is, the very center of the panel which typically contacts the mold first, and thus typically cools somewhat more quickly, undergoes very little stretching whereas points at increasing distances from the center and particularly those proximate the edges of the mold cool more slowly and may undergo significant stretching. This stretching or radial movement which occurs parallel to the surface of the mold is believed to interfere with full formation of the grain or texture as the graining or texturing surface irregularities of the mold are not filled because the movement vectors of the thermoplastic material thereacross have significant horizontal components and relatively small vertical components. By way of contrast, the vector in the center of the mold has essentially only a vertical component directed toward the surface of the mold.

Because the sliding and stretching motion occurs in a radial direction substantially uniformly about the center of the mold, a visible halo-like imperfection appears on the finished product. The halo is, as noted, a result of varying reflectivity of the surface from the center of the molded panel outward to its edges.

The invention disclosed and claimed herein is directed to eliminating the problem of halos and other irregularities appearing on textured or grained panels of thermoformed products.

SUMMARY OF THE INVENTION

A method of thermoforming thermoplastic panels comprises the steps of forming a thermoplastic panel by extrusion or a similar process and simultaneously or subsequently texturing or graining at least one face thereof, and utilizing such pre-textured or pre-grained panels to form a finished panel, an article or product by disposing such panel in a thermoforming mold having at least one grained or textured mold surface against which the pre-textured or pre-grained face of the panel is disposed and thermoforming such grained or textured panel. The two-step graining process provides a texture or grain on a surface having greatly improved uniformity and thus enhanced appearance.

The finished panel may be used as fabricated, may be combined with a second panel to form a hollow structure or may be combined with an in-situ foam or a rigid pre-form and a second panel to form a reinforced panel structure.

Thus it is an object of the present invention to provide a method of forming panels, articles or products of thermoplastic panels which exhibit uniform texturing and graining.

It is a further object of the present invention to provide a method of uniformly texturing or graining thermoplastic panels for use as covers, hatches and the like on motor vehicles.

It is a still further object of the present invention to provide a method of manufacturing thermoformed products of thermoplastic panels having uniform texturing or graining and the product formed by such method.

Further objects and advantages of the present invention will be apparent by reference to the following description of the preferred embodiment and appended drawings wherein like reference numbers among the several figures refer to the same component, element or feature.

DESCRIPTION OF THE PREFERRED EMBODIMENT

Figure 1:
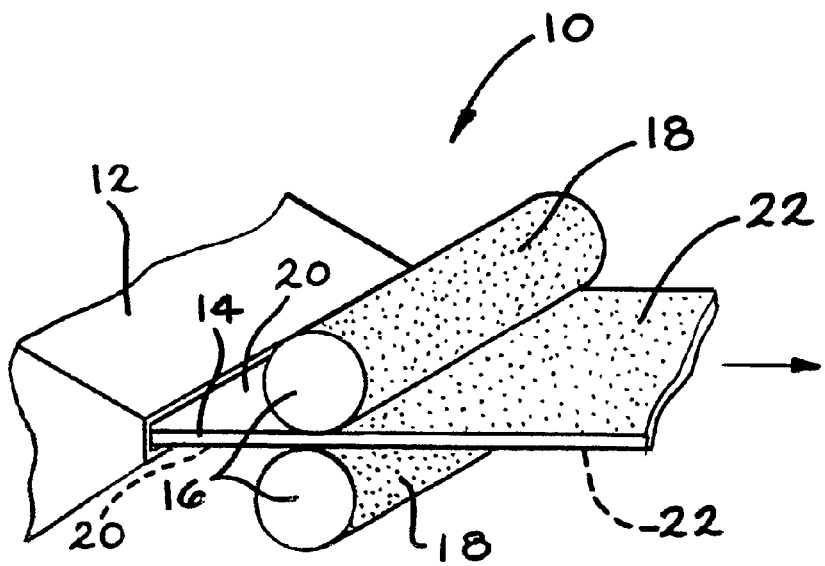
FIG. 1 is a diagrammatic, perspective view of an extruding machine producing a textured or grained thermoplastic sheet.
Figure 2:
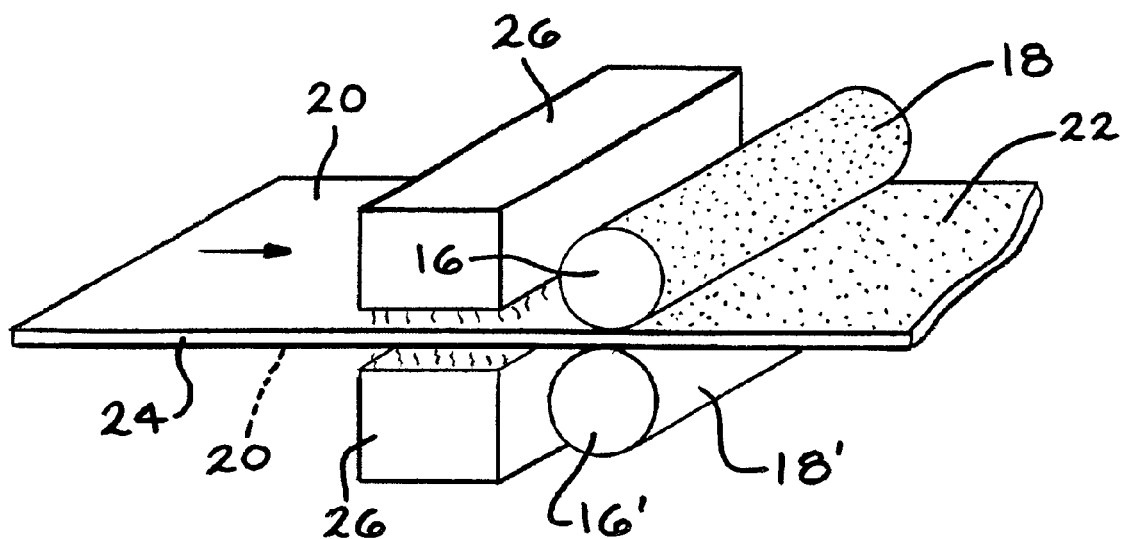
FIG. 2 is diagrammatic, perspective view showing the post production texturing or graining of one face of a thermoplastic sheet.

Referring now to FIGS. 1 and 2, a first step in the production of a thermoformed panel, component, product or article is illustrated and generally designated by the reference number 10. An extruding machine 12 includes a supply hopper typically filled with ground, powdered or granulated thermoplastic material such as high density polyethylene (HDPE), acrylonitrile-butadiene-styrene (ABS), polypropylene, an auger or augers, polyethylene and thermoplastic olefins (TPO), and elongate extruding head (all not illustrated). A continuous sheet 14 of extruded material or extrudate exits from the extruding machine 12 at an elevated temperature. Subsequent to extrusion and preferably while the extruded continuous sheet 14 is still at an elevated temperature, it is passed between a pair of opposed rollers 16 having a texture or grain 18 which is impressed upon both the upper and lower surfaces 20 of the extruded continuous sheet 14 to produce a textured or grained surface 22. Subsequent to the texturing or graining process step, the extruded continuous sheet 14 is cut transversely into sheets or panels 24 in a reciprocating blade cutter (not illustrated) or similar device and then cooled.

As used herein, the terms "texture" and "grain" or "texturing" and "graining" refer broadly and generically to various types of surface treatments which include small scale random, irregular, semi-irregular or regular surface finishes having aesthetic significance and which mimics, for example, leather, wood or other natural or manmade surfaces, surface treatments or finishes. When used alone, the terms "texture" or "texturing" are used generically and are intended to and should be construed to include grain or graining and all other similar terms relating to small scale, aesthetic surface finishes and treatments.

Generally speaking, it is necessary to texture only one of the two surfaces 20 of the extruded continuous sheet 14 or the panels 24 and thus the texture or grain 18 is necessary on only the upper or the lower one of the pair of rollers 16. However, inasmuch as texture or grain on both the upper and lower surfaces 20 renders the extruded continuous sheet 14 and the thermoplastic panels 24 surface placement insensitive, i.e., either surface placement (up or down) may be re-grained in subsequent process steps, it may be preferable to texture or grain both the upper and lower surfaces 20 such that when subsequently used, frequently after both storage and transport, either surface placement of the extruded continuous sheet 14 and the panels 24 will result in proper placement of a textured surface 22 in a subsequent manufacturing step, such as adjacent a mold surface on what will be an outer surface of the product or article and thus achieve a desired product or article according to the present invention without requiring a check to ensure that the extruded sheet 14 or the panel 24 is properly placed prior to such manufacturing step.

FIG. 1 illustrates texturing, graining or other surface treatment of the extruded continuous sheet 14 of material immediately subsequent to extrusion and, as noted, while the extruded continuous sheet 14 is still at an elevated temperature. In situations where immediate, post-extrusion texturing or graining is unavailable or undesirable from either machinery or manufacturing standpoints, the extruded thermoplastic panels 24 may be subsequently textured or grained at any convenient time. As illustrated in FIG. 2, the extruded thermoplastic panels 24 are translated through opposed heaters, such as gas or electric infrared or convection heating assemblies 26, which elevate at least the temperature of the surface and typically the entirety of the thermoplastic panels 24 prior to their passing between opposed rollers 16 and 16'. Texturing of only a single surface 20 of the thermoplastic panels 24 by the upper roller 16 having surface texture 18 and a lower roller 16' having a smooth, i.e., untextured or ungrained, surface 18' is achieved. As noted above, since the majority of applications and uses for the panels 24 require only one textured or grained surface 22, the use of a single textured or grained roller 16 is sufficient. As also noted above, however, such single surface texturing or graining renders the panels 24 placement sensitive.

It should be understood that the immediate post-extrusion texturing or graining step illustrated in FIG. 1 may, as noted previously, be utilized to texture or grain only a single surface 20 of the panels 24 and similarly that the post-production texturing or graining illustrated in FIG. 2 may be utilized to texture or grain both the upper and lower surfaces of the thermoplastic panels 24.

Figure 3:
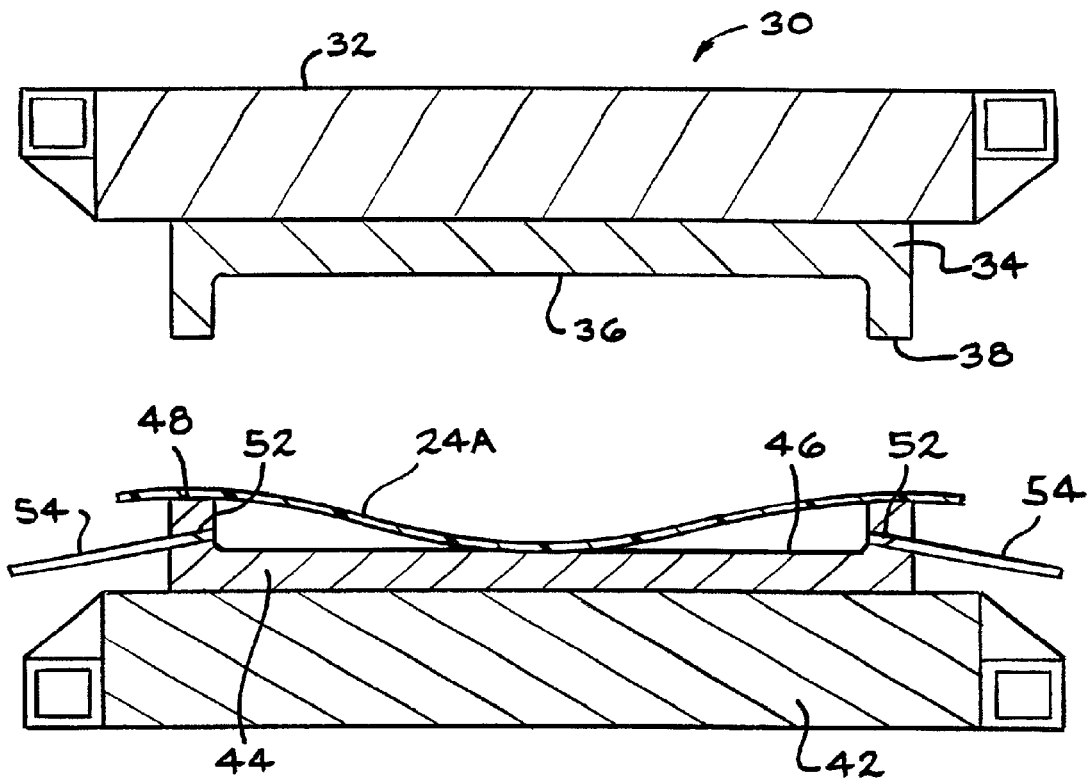
FIG. 3 is a diagrammatic, full sectional view of an open two piece thermoforming mold in which a pre-textured or pre-grained thermoplastic panel has been disposed.

Referring now to FIG. 3, a thermoforming molding machine 30 suitable for practicing the present invention is illustrated and includes a first or upper platen 32 to which is secured a first or upper mold section 34. The upper platen 32 is disposed upon suitable vertical rods or guides (not illustrated) for bi-directional vertical translation. The upper mold section 34 includes a textured or grained upper mold surface 36 having texturing, graining or other surface treatment which is desired to be molded into an outer surface of a thermoformed article or product. Preferably, the pattern of texturing or graining of the upper mold surface 36 will be the same as that on the surface 22 of the thermoplastic panel 24. About the periphery of the upper mold section 34 is a first or upper planar, continuous edge 38.

In accurate vertical alignment with the upper platen 32 and the upper mold section 34 is a lower platen 42 and a lower mold section 44. The lower mold section 44 includes a textured or grained lower mold surface 46 as well as a second or lower planar continuous edge 48 which aligns with and is co-extensive with the continuous edge 38 of the upper mold section 34. When the upper and lower mold sections 34 and 44 are brought together, they define a mold cavity 50 and the continuous edges 38 and 48 align and grip a pre-textured or pre-grained thermoplastic panel 24. The lower mold section 44 includes a plurality of oblique channels or passageways 52 which receive axially movable air tubes or air injectors 54. Preferably, three air tubes or air injectors 54 are disposed along both the left and right sides of the lower mold section 44.

A first or upper panel 24A is first heated to a suitable temperature sufficient to render the particular thermoplastic material plastic or pliable when subjected to molding in the mold cavity 50. Such heating can be accomplished by the electric or gas convection or infrared ovens or heaters 26 illustrated in FIG. 2. Alternatively, the panels 24 may be provided to the molding machine 30 immediately after extrusion and texturing as illustrated in FIG. 1.

When the upper platen 32 and the upper mold section 34 are raised or separated from the lower platen 42 and the lower mold section 44, to the position illustrated in FIG. 3, the single first or upper panel 24A of thermoplastic material is inserted into the space between the mold sections 34 and 44 with a textured or grained surface 22 facing the upper mold section 34. Again, if the first panel 24A is textured on both surfaces 22, it may be disposed in the upper mold section 34 with either surface 22 up. If it is textured only on one surface 20, the first panel 24A must be checked to ensure that the texturing is facing up, toward the upper mold surface 36.

Figure 4:
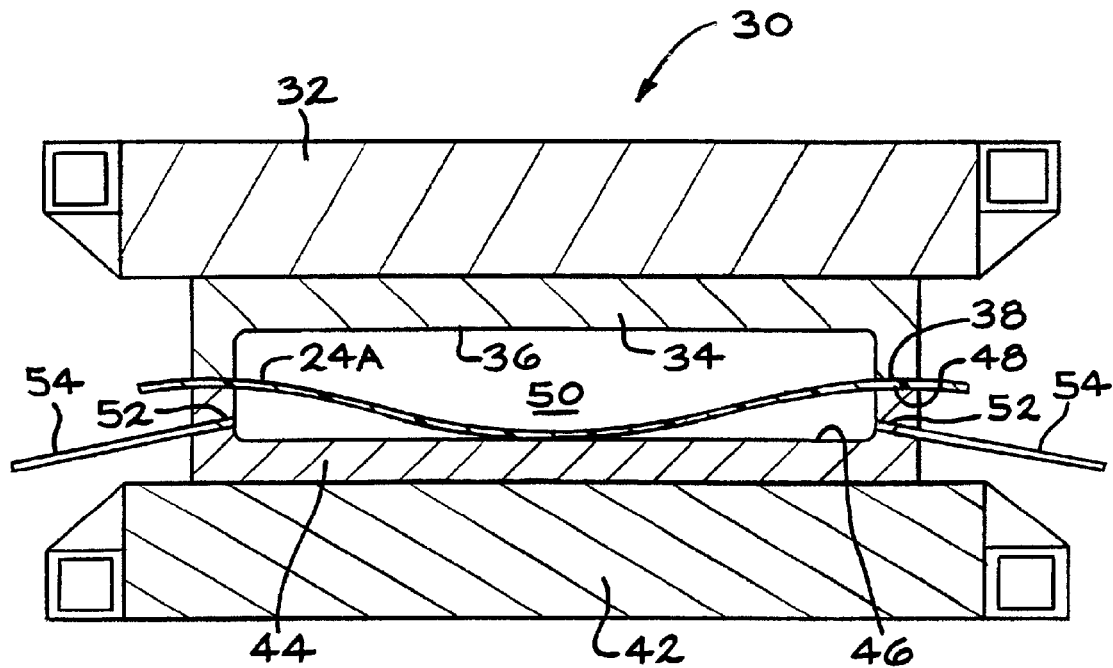
FIG. 4 is a diagrammatic, full sectional view of a two piece thermoforming mold in which a pre-textured or pre-grained thermoplastic panel has been disposed.

Referring now to FIG. 4, the upper platen assembly 32 and upper mold section 34 are lowered such that the upper continuous edge 38 engages and grips the upper surface of the thermoplastic panel 24A and the lower continuous edge 48 engages and grips the lower surface of the panel 24A such that the thermoplastic panel 24A is tightly and sealingly held within the mold cavity 50 between the upper and lower mold sections 34 and 44.

Figure 5:
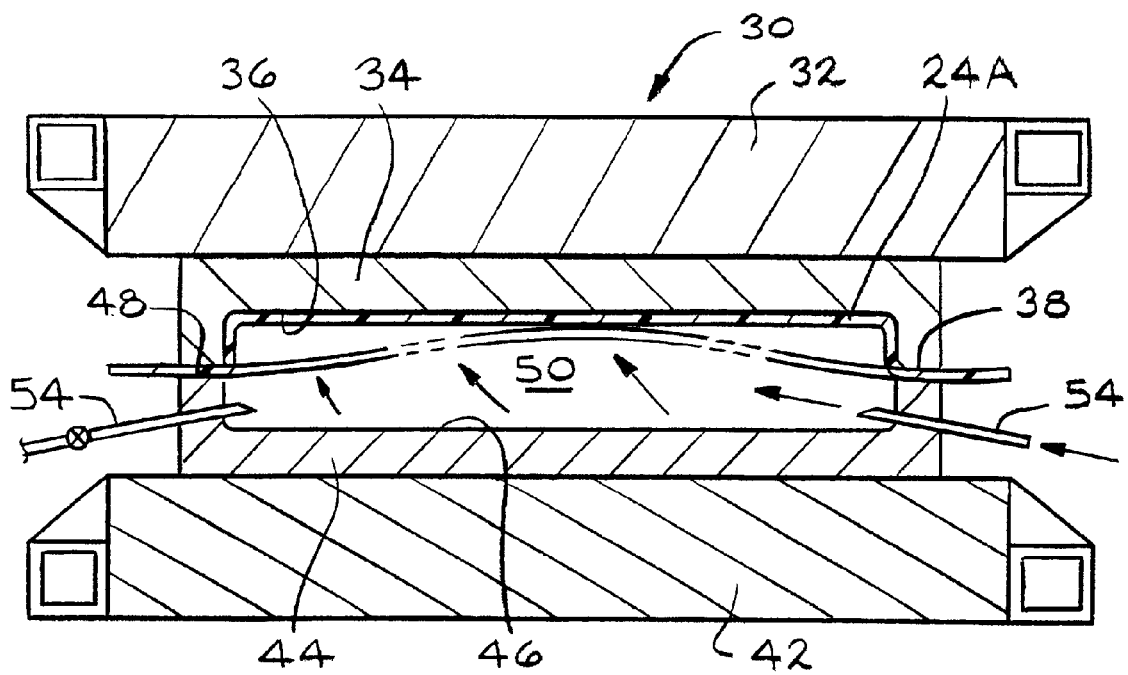
FIG. 5 is a diagrammatic, sectional view of a thermoforming mold wherein air is injected to drive the thermoplastic panel against the upper mold face.

Referring now to FIG. 5, the plurality of air tubes or air injectors 54 are advanced into the mold cavity 50 and a flow of air under pressure is delivered into the mold cavity 50 through the air tubes or injectors 54 thereby driving the thermoplastic panel 24A upward into intimate contact with the textured or grained mold surface 36 of the upper mold section 34. Typically, air provided to the mold cavity 50 is at about 50 p.s.i. and, depending on operating variables, may be in the range of 40 to 80 p.s.i.

Figure 6:
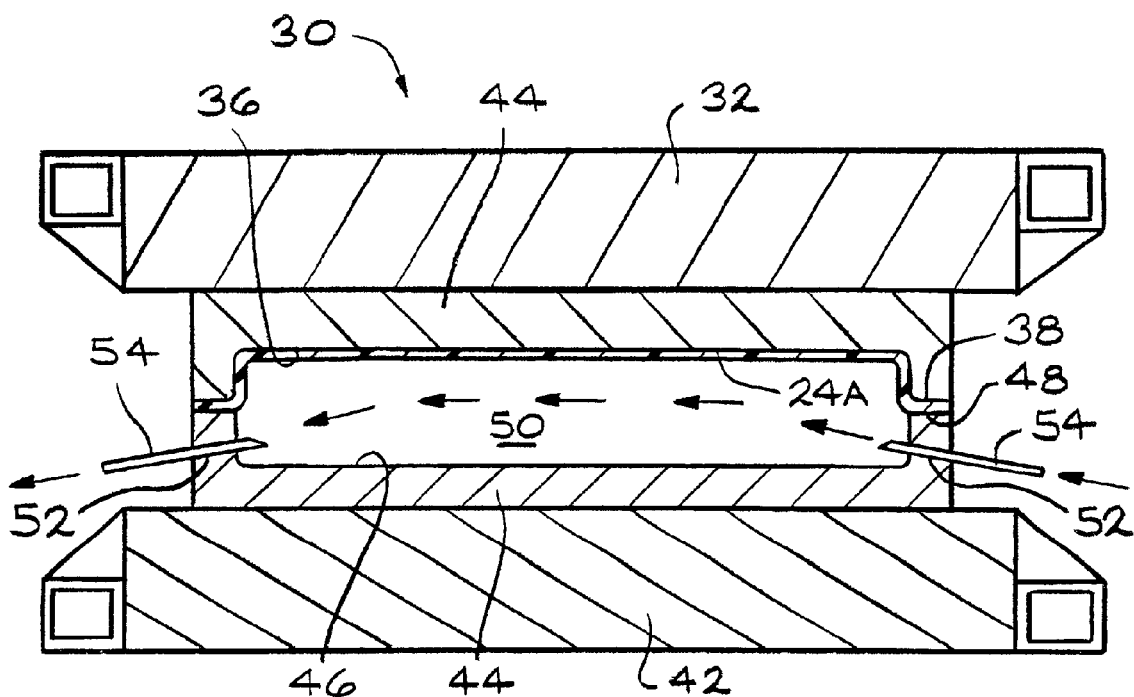
FIG. 6 is diagrammatic, sectional view of a thermoforming mold wherein air is injected and exhausted from the mold to facilitate cooling of the thermoplastic panel.

Referring now to FIG. 6, after the passage of a suitable period of time during which the first thermoplastic panel 24A partially cools, the flow of air under pressure into the mold cavity 50 is modified such that air flows in through the plurality of air tubes or injectors 54 on one side of the lower mold 44 and out through the plurality of air tubes or injectors 54 on the opposite side of the lower mold 44. So configured and operated, a certain pressure is maintained within the mold cavity 50 while at the same time a significant flow of cooling air is provided which rapidly reduces the temperature of the first thermoplastic panel 24A, thereby ensuring both a reasonable process cycle time and that the desired position of the panel 24A against the textured mold surface 36 of the upper mold section 34 and thus the desired shape is maintained.

Figure 7:
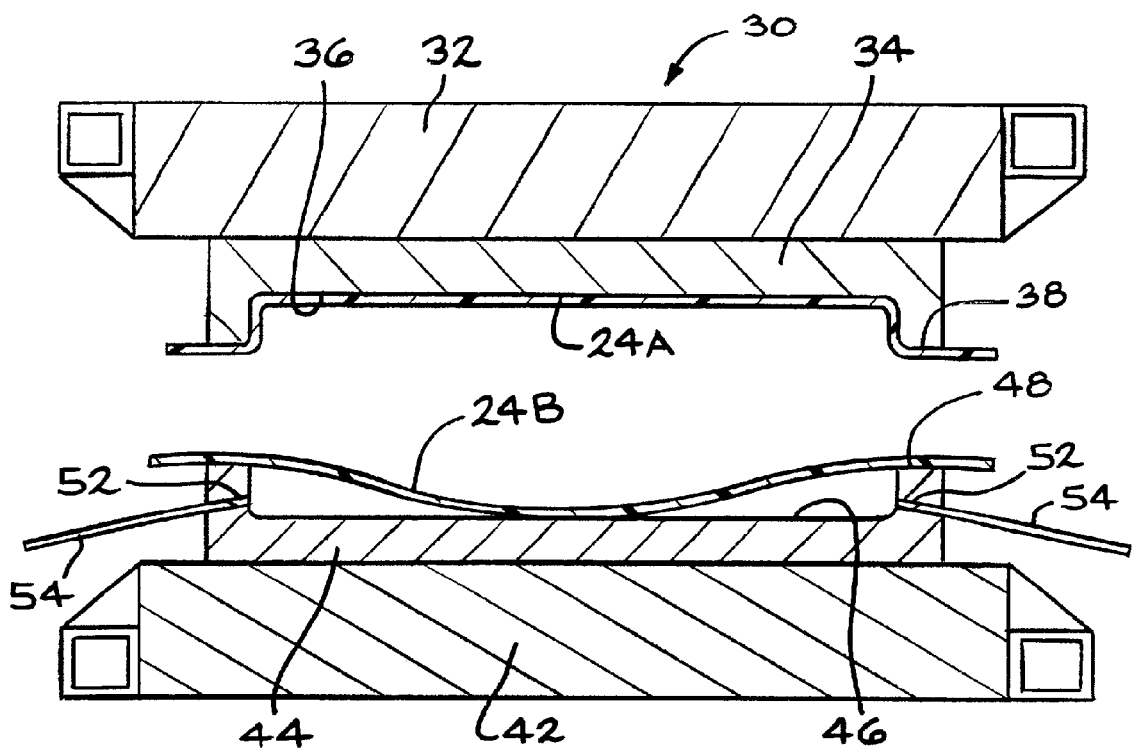
FIG. 7 is a diagrammatic, sectional view of a thermoforming mold which has been opened to receive a second, lower thermoplastic panel.

Referring now to FIG. 7, the upper platen assembly 32 and the upper mold section 34 as well as the textured or grained first thermoplastic panel 24A are raised. If the desired product is simply a molded thermoplastic panel having improved texturing or graining uniformity, the product is complete and may be removed from the upper mold section 34. If the final product includes two panels, a second or lower thermoplastic panel 24B is placed in position within the lower mold section 44. Upon proper disposition of the second or lower thermoplastic panel 24B within the lower mold section 44, such that its textured or grained surface 22 faces down, toward the textured surface 46 of the lower mold section 44. The upper platen 32 and the upper mold section 34 as well as the grained or textured first thermoplastic panel 24A are lowered so that the continuous edges 38 and 48 securely and sealingly engage the thermoplastic panels 24A and 24B positioned between the mold sections 34 and 44.

Figure 8:
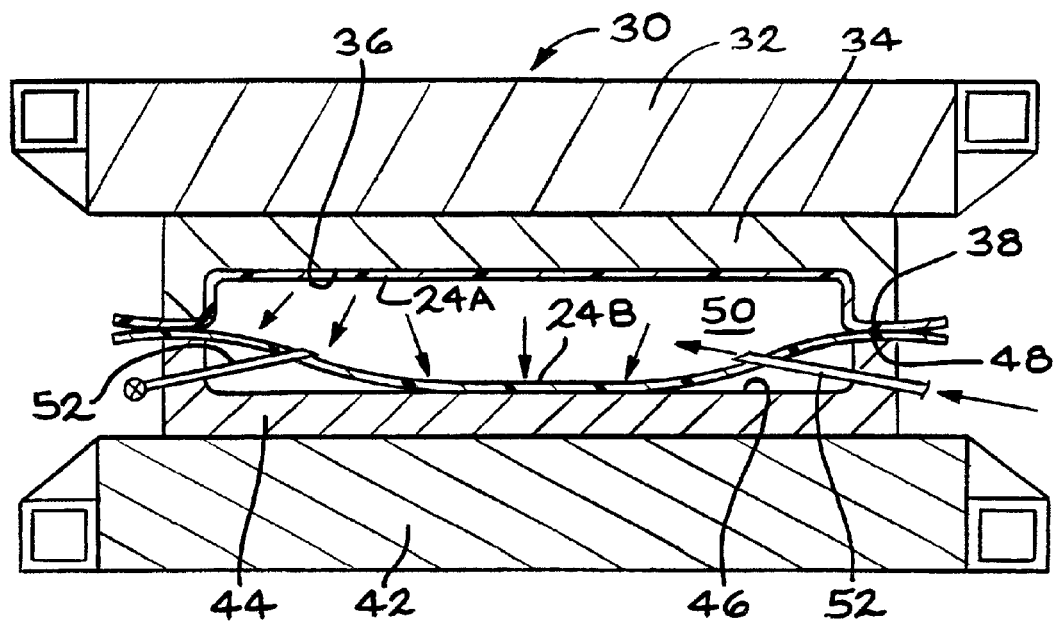
FIG. 8 is a diagrammatic, sectional view of a thermoforming mold wherein air is being injected into the mold to drive the second thermoplastic panel against the lower mold surface.
Figure 9:
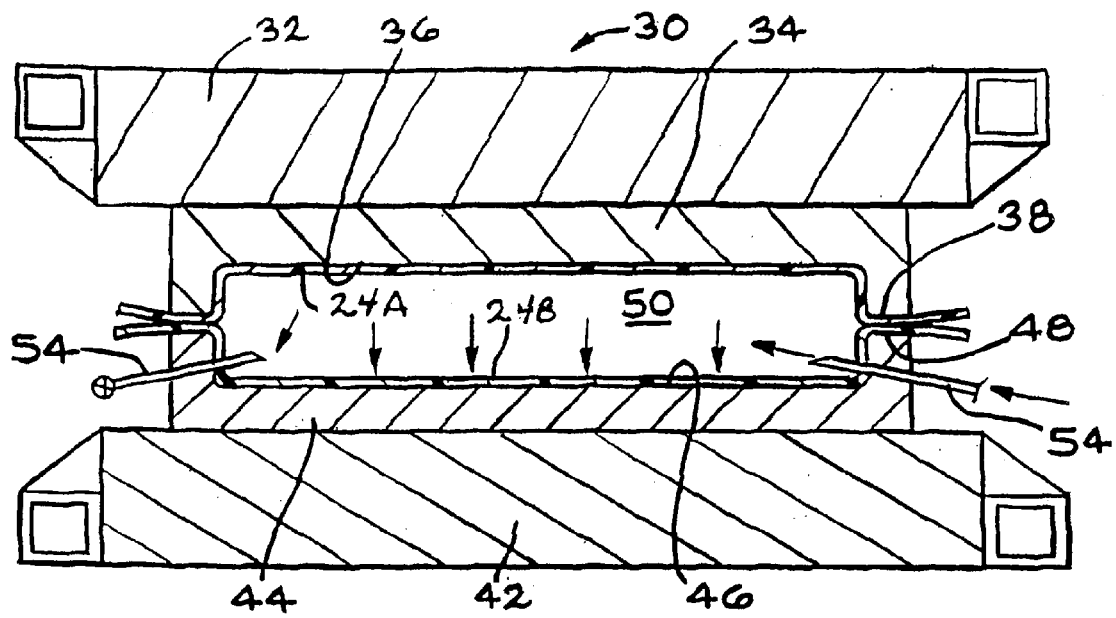
FIG. 9 is a diagrammatic, sectional view of a thermoforming mold wherein the second, lower thermoplastic panel has been driven into intimate contact with the second, lower mold surface.

Referring now to FIG. 8, the air tubes or injectors 54 are now once again extended into the mold cavity 50, through the second thermoplastic panel 24B and a flow of air under pressure is once again provided through them such that the second thermoplastic panel 24B is forced into intimate contact with the lower mold surface 46 to both conform the shape of the second thermoplastic panel 24B thereto and impart the graining or texturing on the surface of the lower mold surface 48 onto the lower surface of the second thermoplastic panel 24B. The completion of this step and the intimate contact of the second thermoplastic panel 24B with the textured surface 46 of the lower mold section 44 is illustrated in FIG. 9.

Figure 10:
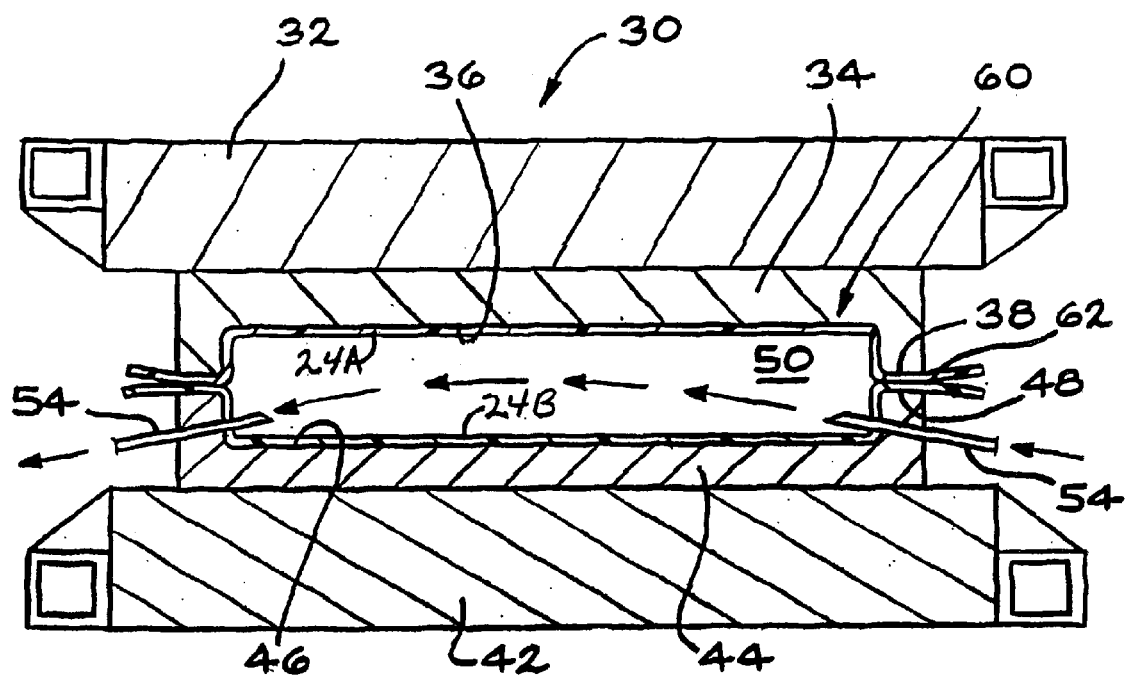
FIG. 10 is a diagrammatic, sectional view of a thermoforming mold wherein air is being injected to and exhausted from the interior of the mold to cool the lower thermoplastic panel.

Referring now to FIG. 10, the supply of air into the mold cavity 50 through the air tubes or injectors 54 is once again modified such that air under pressure is provided to the mold cavity 50 through the plurality of the air tubes or injectors 54 on one side of the lower mold section 44 and is removed or released from the mold cavity 50 through the plurality of air tubes or injectors 54 on the opposite side of the lower mold section 44. The flow of cooling air under pressure through the mold cavity 50 thus ensures that the lower thermoplastic panel 24B will remain in intimate contact with the lower mold surface 46 as it cools to provide both the desired overall shape to the panel 24B as well as the textured surface.

It should be appreciated that quite commonly only one of the two outer surfaces, that is, the upper surface of the first thermoplastic panel 24A or the lower surface of the second thermoplastic panel 24B need be textured or grained as typically only one of such surfaces will be an appearance surface, the other being disposed within a vehicle, vehicle compartment or in some other location where it is not generally visible. Thus while the foregoing disclosure has taught the texturing or graining of both exposed (outer) surfaces of a product or article, it should be appreciated that quite commonly only one outer surface (of only one panel) will require texturing or graining according to the present invention as only one surface of a final article or product will be visible, i.e., will be an appearance surface.

At the completion of the forming and cooling cycle, the upper platen assembly 32 and upper mold section 34 may be raised and a completed product or part 60 comprising the first or upper thermoplastic panel 24A and second or lower thermoplastic panel 24B which are now sealed about their peripheries due to the pressure applied by the continuous edges 38 and 48 of the upper mold section 34 and lower mold section 44, respectively, may be removed from the machine 30. Excess material or flash 62 about the periphery of the product or part 60 may then be removed by conventional processes.

Figure 11:
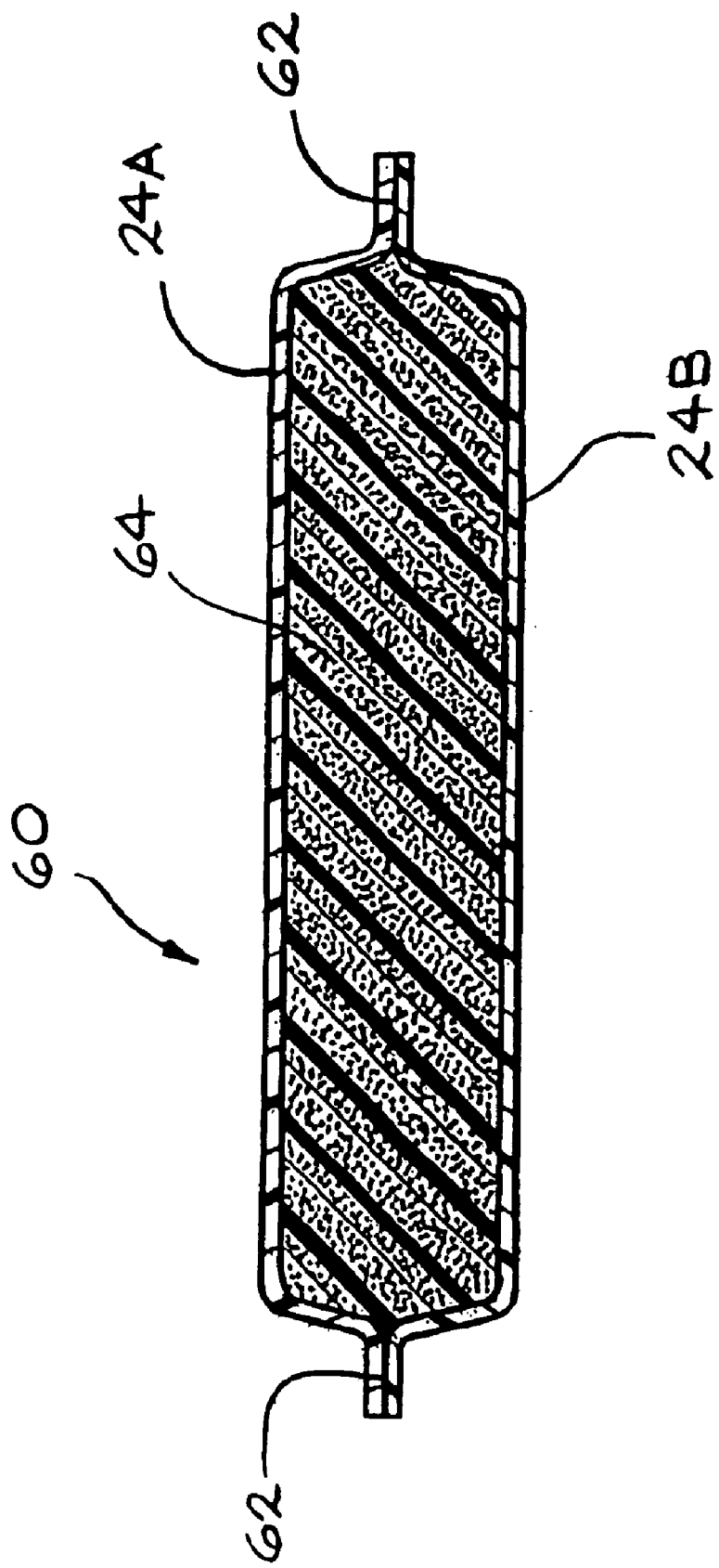
FIG. 11 is a full, sectional view of a product having panels formed according to the present invention with a core of rigid foam or other material.

Referring now to FIG. 11, it will be appreciated that the product 60 will typically not be hollow but will be filled with foam 64 or other relatively lightweight and rigid reinforcing material which is either in-situ molded or inserted as a rigid preform during the step illustrated in FIG. 7. Preforms of other rigid or relatively rigid and lightweight materials such as metal honeycomb, balsa wood or other rigid and lightweight materials may also be used to fill the interior of the product 60, if desired.

The foregoing disclosure is the best mode devised by the inventors for practicing this invention. It is apparent, however, that apparatus and methods incorporating modifications and variations will be obvious to one skilled in the art of thermoforming processes. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A method of forming a textured panel comprising:

providing a panel of thermoplastic material having at least one textured surface;

providing a mold having at least one textured surface;

disposing the panel of thermoplastic material in the mold such that the textured surface of the panel is facing the textured surface of the mold; and forming the panel of thermoplastic material in the mold.

2. The method of forming the textured panel according to claim 1 wherein the panel of thermoplastic material having at least one textured surface is formed by extruding a thermoplastic material into a sheet; texturing at least one surface of the sheet and cutting the sheet to form the panel having the at least one textured surface.

3. The method of forming the textured panel according to claim 2 further comprising texturing the at least one surface of the sheet while the sheet is at an elevated temperature.

4. The method of forming the textured panel according to claim 1 wherein the panel of thermoplastic material provided has two textured surfaces.

5. The method of forming the textured panel according to claim 1 further comprising disposing a second panel of thermoplastic material in a second mold and forming the second panel of thermoplastic material in the second mold.

6. The method of forming the textured panel according to claim 1, further comprising providing air under pressure to the mold during the forming step.

7. The method of forming the textured panel according to claim 1 further comprising providing heat to the at least one surface of such the panel of thermoplastic material in the forming step.

8. A method of forming a textured panel comprising:

extruding a sheet of thermoplastic material;

texturing at least one surface of the sheet of thermoplastic material;

forming a panel from the textured sheet;

providing a mold having a at least one textured surface;

disposing the panel of thermoplastic material in the mold with the textured surface of the panel facing the textured surface of the mold, and forming the panel of thermoplastic material in the mold.

9. The method of forming the textured panel according to claim 8 further comprising texturing the at least one surface of the sheet of thermoplastic material while the sheet is at an elevated temperature subsequent to the extrusion step.

10. The method of forming the textured panel according to claim 8 further comprising texturing two surfaces of the sheet of thermoplastic material.

11. The method of forming the textured panel according to claim 8 further comprising disposing a second panel of thermoplastic material in a second mold and forming the second panel of thermoplastic material in the second mold.

12. The method of forming the textured panel according to claim 8 further comprising providing air under pressure to the mold during the forming step.

13. The method of forming the textured panel according to claim 8 further comprising providing heat to the at least one surface of the panel of thermoplastic material during the forming step.

14. The method of forming the textured panel according to claim 5, wherein the second panel of thermoplastic material disposed in the second mold has at least one textured surface and the second mold has at least one textured surface.

15. The method of forming the textured panel according to claim 14, wherein a periphery of the textured panel formed and a periphery of the second textured panel formed are sealed.

16. The method of forming the textured panel according to claim 15, wherein foam is disposed between the textured panel formed and the second textured panel formed and within the sealed peripheries of the panels.

17. The method of forming the textured panel according to claim 11, wherein the second panel of thermoplastic material disposed in the second mold has at least one textured surface and the second mold has at least one textured surface.

18. The method of forming the textured panel according to claim 17, wherein a periphery of the textured panel formed and a periphery of the second textured panel formed are sealed.

19. The method of forming the textured panel according to claim 18, wherein foam is disposed between the textured panel formed and the second textured panel formed and within the sealed peripheries of the panels.

* * * * *